United States Patent Office 2,952,552
Patented Sept. 13, 1960

2,952,552

MEAT PRODUCT AND METHOD OF MAKING THE SAME

Harry R. Ansel, Elmwood Park, Ill., assignor to Wm. J. Stange Co., Chicago, Ill., a corporation of Illinois No Drawing. Filed Aug. 7, 1958, Ser. No. 753,599

9 Claims. (Cl. 99—208)

This invention relates to shelf-stable meat products and methods of preparing the same, and more particularly to shelf-stable low moisture cooked cured meat products.

This application is a continuation-in-part of my co-pending application, Serial No. 632,982, filed January 8, 1957, now abandoned.

Fresh and cured meats are highly susceptible to deterioration due to microbial action, enzymic action and oxidation of the natural fats; and consequently have limited shelf life. Consequently, it has not heretofore been possible to satisfactorily produce a shelf-stable meat product having a high fat, high protein and a low moisture content. For example, bacon is a highly perishable product. Most of the sliced bacon available in stores has developed a considerable degree of rancidity before it is sold. Rancid bacon generates a most disagreeable odor during the frying process and has a correspondingly bad taste. If reasonably fresh when purchased, sliced bacon must be refrigerated in the home and, even then, will become "strong" or rancid within a matter of two or three weeks, depending upon its quality when purchased.

As far back as ten years ago attempts were made to incorporate antioxidants (such as the then recently discovered N.D.G.A.) in the cured meats, such as bacon, by various methods before, during and/or after the curing and smoking steps forming parts of the manufacturing process. The results obtained were poor. Although antioxidants are actually capable of protecting many fats against rancidity, the antioxidants apparently were ineffective when applied to slab bacon. Failure to obtain protection against rancidity was also noted when antioxidants were applied to the cut surfaces of fresh bacon during the slicing process or immediately thereafter. Even when a number of different solvents for the antioxidants were tried, the results were no better.

Meat, especially cured meat, in addition to being used as a main course of a meal, is frequently used as flavoring ingredients for other foods. Heretofore, it has not been possible to cook meat and store it for any length of time prior to its consumption, due to the oxidation of the fat and the development of rancidity. For example, bacon particularly in fried form, is conventionally used as a flavoring component of meat and vegetable dishes such as omelets, fried eggs, green and yellow Lima beans, baked beans, vegetable salads, soups, liver, filet mignon, turkey, various dressings and the like. In many instances, when bacon is used as a flavoring agent it is necessary to first fry sliced bacon, then either the fried bacon strip alone or the fried strip together with all or part of the rendered fat is used in the preparation of whatever dish it is desired to flavor. Thus, a separate preliminary step must then be performed to prepare the bacon for use as a flavoring composition, which ordinarily also involves soiling a separate skillet which must then be washed and dried.

The instant invention permits the manufacture of new and novel shelf-stable meat products having a high fat content, high protein content, and a low moisture content (less than 5%), stabilized against oxidative deterioration by suitable fat soluble antioxidants.

It is therefore an object of the present invention to provide a shelf-stable meat product.

Another object of the present invention is to provide a fully cooked meat product in particulate form which has improved shelf stability.

A further object of the present invention is to provide a stable fried bacon product suitable as is for use as a flavoring composition.

A still further object of the invention is to provide methods of preparing the aforesaid shelf-stable meat products.

The products of the present invention may be prepared from meat obtained from fresh, cured, smoked, or cured and smoked beef, pork, lamb, veal, fish and poultry. If the meat contains an insufficient amount of fat to produce the desired fat content in the finished product then additional fat of animal, vegetable or marine origin may be added. These fats, if desired, may be partially or fully hydrogenated.

A general description of the preparation of products of the present invention is as follows. The meat is cut into chunks small enough to enter a suitable meat grinder and ground coarsely, as by using a coarse plate in the grinder. The ground meat is then rendered in a batch lot, by any suitable conventional rendering method, thereby forming a meat-fat slurry. The meat-fat slurry is then allowed to cool to a temperature below that at which whatever antioxidant to be used is destroyed. However, the fat is not allowed to solidify. A suitable antioxidant is next added and disseminated throughout the meat-fat slurry. The lean meat may then be separated from the hot fat, if so desired. The separated fat is converted to particulate form where it is solid (rather than liquid, or plastic at room temperature), by addition of an edible fat-absorbent solid carrier, or by atomizing the liquid fat into cooled air to solidify the fat into finely divided solid particles, or by spray drying an aqueous emulsion or suspension of the separated fat containing a suitable emulsifying or suspending and coating agent, or by hydrogenation and subsequent grinding or flaking of the cooled hydrogenated fat. The cooked lean meat particles are then recombined with the previously separated fat which has been converted to particulate form.

The preparation of a fully cooked cured meat product, namely, bacon is described as follows. Freshly cured and smoked bacon is put through a sausage grinder using a plate having holes ¼ inch size. The ground product is charged to a rendering kettle (preferably a steam jacketed stainless steel kettle) and rendered until the lean portion is throughly cooked, and substantially all of the moisture is removed therefrom. A steam pressure of 30–60 lbs. per square inch is suitable. During this rendering period the moisture content of the bacon (usually 15%–20%) is lost through vaporization. The resulting meat-fat slurry is then cooled to about 130° F. An antioxidant in an amount of at least 0.001%, based on the weight of the meat-fat mixture, is added to the slurry and throughly dissiminated therethrough. The slurry is then withdrawn from the rendering kettle and filtered to separate the lean meat portions from the bacon fat. Preferably the separated lean meat solids are then placed in suitable containers and refrigerated at 35° to 40° F. until recombined with the fat, as disclosed hereinbelow.

Any of the commercially available fat soluble antioxidants or antioxidant mixtures, such as, nordihydroguairetic acid (N.D.G.A.), butylated ethoxyphenol, butylated hydroxyanisole (B.H.A.), butylated hydroxytoluene (B.H.T.), propyl gallate, or propyl gallate-citric acid mixture, or the like, singly or mixtures thereof, may be used. The amount of antioxidant used preferably ranges from about 0.001% to about 0.1% depending on the particular antioxidant or antioxidant mixture being used. However, a greater quantity may be used but it is usually limited by economic factors.

The separated fat may be converted to particulate form according to any one of the methods described hereinbelow.

A preferred method of converting the fat to particulate form is to mix the meat-fat slurry or separated fat with an edible absorbent such as non-fat dry milk solids, corn meal, bran, cracker or bread crumbs, or the various puffed or expanded cereal products characterized by absorbency and reasonable small particle size. The amount of carrier to be used depends on the characteristics of the particular fat absorbent and is adjusted to yield a granulated product. For the puffed or expanded cereal products the weight ratio of fat to cereal is approximately 3:1. Products prepared according to this method are readily usable and have minimum fat separation over wide temperature ranges during storage.

A second method of converting the liquid fat to particulate form, comprises spraying the fat (at a pressure of 20 lbs. per square inch or higher) through an atomizing nozzle, yielding fine droplets of fat, into a chamber through which circulates cooled air at a room temperature or lower (preferably below 50° F.). The resulting fine particles of solidified fat are collected for blending in the desired proportions with the previously separated cooked lean particles.

A third method of converting the separated fat to particulate form comprises suspending or emulsifying the liquid fat in water by the use of a suitable suspending or emulsifying agent which also serves to coat the minute fat particles in the suspension or emulsion, and spray drying the resulting suspension or emulsion. Such a suspension or emulsion should have a total solids content of from 10 to 50 percent, perferably about 30 to 35 percent. This total solids content includes 10 to 80 percent fat, preferably about 70 to 80 percent. The remainder of the total solids content is a suitable vegetable gum (such as gum arabic or gum karaya or gum tragacanth or the like) or non-fat dry milk solids or lactose or the like. The spray drying is carried out in conventional spray drying apparatus, at an air inlet temperature of about 400° F., an air outlet temperature of about 230° F., an air pressure of 60 to 100 pounds per square inch (preferably at an average pressure of about 80 pounds per square inch), an airflow at the inlet of 12 pounds per minute and at the outlet of 15 pounds per minute, and with the solution to be spray dried injected into the spray chamber at from about 120° to about 170° F. Specifically, a suspension having a total solids content of about 33 percent (made up of 75 percent fat and 25 percent non-fat dry milk solids) is spray dried in this manner.

A fourth method of converting the separated fat to particulate form comprises hydrogenating the fat to an iodine value of 32 or less by any suitable conventional method. The hydrogenated fat is chilled and then flaked or ground to the desired particle size. The particulate fat is then recombined with the cooked lean meat particles.

The fat converted into solid form by ony one of the methods disclosed hereinabove takes the form of discreet particles. The fat particles are then recombined with the solid lean meat particles obtained as a result of the rendering and fat separating steps. In the case of bacon, the resulting mixture will ordinarily contain about one part of solid lean bacon particles and about two parts of particulate fat together with whatever absorbing, or emulsifying and coating agent which may have then been added to the bacon fat to convert the latter to particulate form. The cooked lean meat particles, if necessary, should be ground fine enough to pass through a 6 or 8 mesh screen but not through a 20 mesh screen before being recombined with bacon fat particles.

Example I 200 lbs. of smoked bacon were ground through a 3/16 inch plate. The comminuted bacon was then rendered in a steam jacketed kettle until substantially all of the moisture was removed from the meat-fat mass and the lean portion was medium-well done. The temperature of the meat-fat slurry at the end of the cooking period was approximately 235° F. (NOTE.—A longer cook at lower temperatures achieves the same end result as a shorter cook at a higher temperature.) The hot liquid meat-fat slurry was then cooled to approximately 130° F. and 0.006% crystalline B.H.A., 0.006% crystalline B.H.T., and 0.002% crystalline N.D.G.A. in a suitable carrier was added to the product to protect it against oxidative deterioration. The warm, antioxidant treated meat-fat slurry was then separated into lean and fat fractions. The warm (130° F.) protected fat was then admixed with 40 pounds of a previously ground and sifted puffed wheat cereal and blended until all the fat was absorbed by the cereal. The ratio by weight of fat to cereal approximates 3:1. (The fat absorbents should have about a maximum moisture content of 2.5% at the time of blending with the fat.) The particulate cooked lean meat was then admixed with the particulate fat. The ratio of lean to fat was 1:2. If additional flavoring agents such as salt, pepper, etc. are desired, these materials may be added during the final blending of the ingredients. The product having a moisture content of 3.0% was then packaged in a grease-proof, flexible packaging material that has a very low moisture vapor transmission rate and heat sealed to prevent a free exchange of air. A like quantity of bacon was treated in the same manner, except that no antioxidant was added as hereinbefore described in this example and used as the control. Storage tests were conducted on representative samples to determine the shelf stability of the treated and untreated products. The samples were stored at room temperature ranging from 60° to 95° F. At periodic intervals samples were withdrawn from the test lots and examined by a taste panel. The product that was not treated with an antioxidant showed incipient oxidative deterioration within one week of storage, and after three weeks the oxidation of the fat had progressed to the point where the fat was rancid and the product inedible. After six months storage, the antioxidant treated product did not show any signs of oxidative deterioration.

Example II

A cured and smoked beef bacon product in particulate form was prepared by mixing equal parts of beef bacon and tallow. The meat was comminuted and cooked to a temperature of 220° F. until the meat portion was well done. The resulting meat-fat slurry was then cooled to about 130° F. and 0.01% B.H.A. was incorporated therein. The fat was then separated and converted to particulate form by spray chilling as hereinbefore described. The solidified fat was then admixed with one portion of the separated lean in the weight ratio of lean to fat of 1:1. A like quantity of beef bacon and tallow was prepared in the same manner except that it did not contain the antioxidant and was used as the control. After blending the particulate products (moisture 0.5%) were packaged in a similar flexible packaging material as used in Example I. Similar storage tests were conducted which showed that the untreated product (control) was highly rancid after three weeks storage. At the end of nine months the antioxidant treated samples were still free of rancidity.

Example III

Lean pork trimmings which have been cured and smoked were comminuted and then fully cooked to form a liquid meat-fat slurry. The slurry was separated into lean and fat fractions and the weights thereof were determined. A sufficient quantity of shortening containing vegetable and meat fats, previously stabilized with 0.01% N.D.G.A. and 0.01% B.H.A., was added to the previously separated pork fat to yield a finished weight ratio of lean to fat of 1:4. The previously separated lean was added to the liquid fat and admixed. To this mixture a previously ground puffed wheat cereal was added to absorb the fat and convert the product to particulate form. The ratio of the lean meat-fat to cereal was 3 parts to 1 part by weight. The product, having a moisture content of 4%, was then packaged in hermetically sealed containers and submitted to shelf stability test. At the end of six months at room temperature the product was free from oxidative deterioration.

*Example IV*

Equal parts of ham and bacon were treated in the manner described in Example I, except that 0.001% B.H.A. was used as an antioxidant. The antioxidant was added to the cooked meat-fat slurry at a temperature of 135° F. which is above the solidification temperature of the fat but below the decomposition temperature of the antioxidant. 10 pounds of puffed wheat were added to 90 pounds of the meat-fat slurry at a temperature of 100° F. After the fat had been absorbed by the puffed wheat the product was packed and sealed in flexible, moisture proof, transparent packaging material. Products similarly prepared but not treated with antioxidant had a shelf life of less than two weeks; whereas the antioxidant treated product did not begin to show signs of rancidity until after ten months of storage.

Similar products were prepared from various blends of other meats and fats with the meat solids:fat weight ratios ranging from 1:1 to 1:4, lean meat solids ranging from 15% to 40%, fat ranging from about 40% to 80%, and edible fat absorbent carriers ranging from about 10% to 30%. When the cooked meat products are prepared as herein disclosed with the edible fat absorbent as the means for converting the fat portion to particulate form it is very important that the moisture content of the cereal does not exceed 2.5%. The products should be packaged in low moisture vapor transmission containers or materials and sealed against the atmosphere since the edible cereal is highly hygroscopic.

It will be apparent to those skilled in the art that there are many combinations of lean meat tissue and fat (vegetable, animal or marine) that may be used to produce novel and highly nutritious shelf stable cooked meat products in accordance with this invention.

If desired, the flavor of the product may be enhanced by incorporating therewith one of the commercially available smoke flavor concentrates or smoked yeast. These materials may be added to the product either at the time the antioxidant is added or when the solid particles and the solidified fat are recombined to form the finished product.

The present meat products are ready, without any preliminary preparation, even without any prior comminution or disintegration, for consumption as is or for addition to any appropriate dish to be flavored. For this purpose, the product can be removed from a container in any desired amount and measured by simply using a spoon without having the product adhere to the spoon. Thus, the product can be dispensed accurately. Due to its finely subdivided condition, it is easily stirred into salads, salad dressings, eggs, sandwich spreads and the like. For instance, after fresh green beans have been boiled in water to cook the beans thoroughly, and after most of the water has been removed, a small amount of the bacon product is added and the cooking is continued for about five minutes whereby the bacon fat is melted and the bacon flavor infused into the beans. Further, the bacon product may be added, with similar flavoring results, to hot dishes such as macaroni, spaghetti, various casserole and baked dishes, soups and the like.

It should be understood that, if it is desired merely to stabilize meat, say bacon, against rancidity and if the advantages flowing from the conversion of the fat into particulate form can be relinquished, then the separation of the rendered fat from the solid lean particles as well as all the subsequent steps can be omitted. In other words, the above disclosed process is followed up to and including the step of incorporating an antioxidant with the slurry resulting from the rendering step. The slurry containing an antioxidant disseminated therethrough is then allowed to cool before or after being put in suitable containers. The product thus obtained is stable with respect to rancidity, but is not subdivided into discrete particles. Instead, the product forms a solid mass which is more or less plastic at room temperature. However, where these features are not objectionable, the product is more convenient to use, particularly for flavoring purposes.

Many details may be varied without departing from the principles of this invention and it is therefore not my purpose to limit the patent granted on this invention otherwise than necessitated by the scope of the appended claims.

The invention is claimed as follows:

1. A method of preparing a stable meat product having lean and fat portions, said method comprising comminuting and rendering said meat, and incorporating an antioxidant in the rendered meat when the fat portion of the meat is in a liquid state, said antioxidant being uniformly dispersed in said fat portion and being sufficient in quantity to substantially prevent rancidity.

2. The method as set forth in claim 1 in which, after the antioxidant has been incorporated into the rendered meat, the latter is converted into particulate form.

3. The method as set forth in claim 2 in which said conversion is achieved by the addition of edible, fat-absorbent particles to said fat portion when the latter is in a liquid state.

4. A method of preparing a stable meat product having lean and fat portions, said method comprising comminuting and rendering said meat, and incorporating an antioxidant in the rendered meat while the meat is at a temperature below the decomposition temperature of said antioxidant but above the solidification temperature of said fat portion of the meat, said antioxidant being uniformly dispersed in said fat portion and being sufficient in quantity to substantially prevent rancidity.

5. The method of preparing a stable cooked bacon product having lean and fat portions, said method comprising comminuting and rendering said bacon, incorporating an antioxidant in the rendered bacon when the fat portion of the bacon is in a liquid state, said antioxidant being uniformly dispersed in said fat portion and being sufficient in quantity to substantially prevent rancidity, and then adding to the rendered bacon while the fat portion of the bacon is still in a liquid state an edible carrier comprising an expanded cereal product in particulate form and in which the weight ratio of carrier to fat is at least one part of carrier to three parts of fat.

6. A shelf-stable, rendered meat comestible in which the lean portion of the meat is comminuted, and characterized by the fat portion of the meat being protected against rancidity by the presence of an antioxidant which is intimately and uniformly dispersed throughout said fat portion.

7. A shelf-stable, cooked-meat comestible in which the lean and fat portions of the meat are separated but each in particulate form, and in which the comestible is protected against rancidity by the presence of an antioxidant which is intimately and uniformly dispersed throughout said fat portion.

8. A shelf-stable, cooked-meat comestible as set forth in claim 7 in which the fat portion is absorbed in and carried by an edible, particulate, fat-absorbent substance.

9. A shelf-stable, cooked-meat comestible as set forth in claim 7 in which the fat portion is absorbed in and carried by an edible, particulate, fat-absorbent substance, and in which said edible substance is an expanded cereal product.

References Cited in the file of this patent

UNITED STATES PATENTS

| | | |
|---|---|---|
| 1,521,127 | Remus | Dec. 30, 1924 |
| 2,345,463 | Cox | Mar. 28, 1944 |
| 2,346,232 | Piret et al. | Apr. 11, 1944 |
| 2,406,395 | Noel | Aug. 27, 1946 |
| 2,457,063 | Morgan et al. | Dec. 21, 1948 |
| 2,697,112 | Kramer | Dec. 14, 1954 |
| 2,760,868 | Thommen | Aug. 28, 1956 |
| 2,860,993 | Maher | Nov. 18, 1958 |

OTHER REFERENCES

Food Technology, November 1953, pp. 429, 430 and 431, article entitled Antioxidant Treatment for Bacon, by J. W. Hanley et al.